US010826979B2

(12) United States Patent
Huh et al.

(10) Patent No.: US 10,826,979 B2
(45) Date of Patent: Nov. 3, 2020

(54) APPARATUS AND METHOD FOR LOGICALLY GROUPING CLIENT NODES IN AN IOT ENVIRONMENT USING CLIENT IDENTIFIERS

(71) Applicant: University-Industry Cooperation Group of Kyung-Hee University, Yongin-si (KR)

(72) Inventors: Eui Nam Huh, Yongin-si (KR); Yong Hyun Kim, Yongin-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 364 days.

(21) Appl. No.: 15/830,479

(22) Filed: Dec. 4, 2017

(65) Prior Publication Data

US 2018/0183862 A1    Jun. 28, 2018

(30) Foreign Application Priority Data

Dec. 22, 2016   (KR) .................. 10-2016-0176692

(51) Int. Cl.
*H04L 29/08* (2006.01)
*H04L 12/24* (2006.01)
(Continued)

(52) U.S. Cl.
CPC ........ *H04L 67/1008* (2013.01); *H04L 12/185* (2013.01); *H04L 12/1859* (2013.01);
(Continued)

(58) Field of Classification Search
CPC ............... H04L 67/1008; H04L 12/185; H04L 12/1859; H04L 41/0806; H04L 41/0893;
(Continued)

(56) References Cited

U.S. PATENT DOCUMENTS

2003/0018716 A1   1/2003  Webb et al.
2004/0032486 A1*  2/2004  Shusman ............... G06Q 30/02
                                                                    348/14.09
(Continued)

FOREIGN PATENT DOCUMENTS

KR    10-2011-0079235 A    7/2011
KR    10-1609056 B1        4/2016
(Continued)

*Primary Examiner* — Wing F Chan
*Assistant Examiner* — Billy H Ng
(74) *Attorney, Agent, or Firm* — Studebaker & Brackett PC

(57) ABSTRACT

The present invention relates to technology that allows a logical grouping of client nodes using client identifiers in an Internet of things environment. An apparatus for grouping client nodes according to an embodiment of the invention can include: a manager unit configured that receives a connection request from a client node and assigns a particular MQTT (Message Queuing Telemetry Transport) broker to the client node in response to the connection request; an MQTT brokerage unit that includes at least one or more MQTT brokers and receives from the client node the identifier information and subscribed topic information of the client node by way of the particular MQTT from among the at least one or more MQTT brokers; and a load processing unit that stores the received identifier information and the topic information in a database to newly connect the client node.

13 Claims, 9 Drawing Sheets

(51) Int. Cl.
*H04L 12/18* (2006.01)
*H04L 12/26* (2006.01)

(52) U.S. Cl.
CPC ...... *H04L 41/0806* (2013.01); *H04L 41/0893* (2013.01); *H04L 67/1031* (2013.01); *H04L 67/125* (2013.01); *H04L 67/26* (2013.01); *H04L 67/2809* (2013.01); *H04L 43/0876* (2013.01)

(58) Field of Classification Search
CPC ... H04L 67/1031; H04L 67/125; H04L 67/26; H04L 67/2809; H04L 43/0876
See application file for complete search history.

(56) References Cited

U.S. PATENT DOCUMENTS

| | | | | |
|---|---|---|---|---|
| 2008/0285940 | A1* | 11/2008 | Kulas | G11B 27/3027 386/248 |
| 2009/0164484 | A1* | 6/2009 | Horowitz | H04N 7/17318 |
| 2009/0164904 | A1* | 6/2009 | Horowitz | G11B 27/034 715/723 |
| 2010/0241968 | A1* | 9/2010 | Tarara | G06F 3/0481 715/751 |

FOREIGN PATENT DOCUMENTS

| | | |
|---|---|---|
| KR | 10-1609532 B1 | 4/2016 |
| KR | 10-1625159 B1 | 5/2016 |
| WO | 2016/014516 A1 | 1/2016 |

\* cited by examiner

APPARATUS AND METHOD FOR LOGICALLY GROUPING CLIENT NODES IN AN IOT ENVIRONMENT USING CLIENT IDENTIFIERS

CROSS-REFERENCE TO RELATED APPLICATIONS

This application claims the benefit of Korean Patent Application No. 10-2016-0176692, filed with the Korean Intellectual Property Office on Dec. 22, 2016, the disclosure of which is incorporated herein by reference in its entirety.

BACKGROUND

1. Technical Field

The present invention relates to dynamically performing a logical grouping of client nodes by using the identifiers of the client nodes independent of subscription topic based on MQTT (Message Queuing Telemetry Transport) and transmitting a group-specific mass message for the notifying of emergency situations, maintaining and upkeep of the terminals, etc., in an Internet of things (IoT) environment in which terminals of various purposes are interconnected.

2. Description of the Related Art

The grouping process using topics as utilized in the existing MQTT (Message Queuing Telemetry Transport) may require an adding process of subscribing relevant nodes to a new topic when a new group is needed, and such a process may incur delays. Also, a topic-based grouping in an MQTT environment where large numbers of client nodes are connected may require forming a topic structure of multiple layers, which may drastically increase complexity in operating a service. Also, if only the node ID is available for simply differentiating clients as in regular methods, it would not be possible to check information regarding the environments of the client nodes, so that the purpose of the grouping function would be lost or limited.

Existing techniques may employ simple topic-based classification and thus may require a process of changing the subscription topic according to the circumstances when there is a need for grouping, and as such, real-time grouping cannot be implemented. The process of newly adding a subscription topic may require a predefined agreement with the connected client nodes, so that delays may occur due to unnecessary processes in an IoT-based real-time mobile cloud service. Also, if real-time grouping were to be performed according to a particular need, the degree of freedom in configuring the grouping criteria may be limited by the grouping criteria subservient to the application already installed on the client node.

Thus, with existing technology, there is a limit to adequately providing services based on real-time grouping of various nodes that are connected based on the IoT in a real-time mobile cloud environment.

SUMMARY OF THE INVENTION

An objective of the present invention is to enable a dynamic logical grouping of client nodes by using the identifiers of the client nodes independent of subscription topic based on MQTT in an Internet of things environment where terminals of various purposes are interconnected.

An objective of the present invention is to enable the transmission of group-specific mass messages for the notifying of emergency situations, maintaining and upkeep of the terminals, etc., based on the logical grouping.

An objective of the present invention is to enable an efficient management of large numbers of client nodes through a dynamic logical grouping that is capable of responding to large numbers of client nodes in the home and in fields of industry such as the medical field, etc., where a smart environment is desired.

An embodiment of the invention provides an apparatus for grouping client nodes, where the apparatus can include: a manager unit configured that receives a connection request from a client node and assigns a particular MQTT (Message Queuing Telemetry Transport) broker to the client node in response to the connection request; an MQTT brokerage unit that includes at least one or more MQTT brokers and receives from the client node the identifier information and subscribed topic information of the client node by way of the particular MQTT from among the at least one or more MQTT brokers; and a load processing unit that stores the received identifier information and the topic information in a database to newly connect the client node.

According to an embodiment of the invention, the manager unit can assign the particular MQTT broker from among the at least one or more MQTT brokers in consideration of load.

According to an embodiment of the invention, the MQTT brokerage unit can receive a topic publish message from the client node by way of the particular MQTT broker and can request a topic publishing to the manager unit in response to receiving the topic publish message, and in response to the request, the manager unit can broadcast content related to the topic publishing to other MQTT brokers.

According to an embodiment of the invention, the apparatus for grouping client nodes can further include a dashboard control unit that controls the transmission of a group-specific mass message, where the dashboard control unit can read a group-specific client node identifier and connection information associated with the at least one or more MQTT brokers from a database and can control the manager unit to publish a topic subscription status and the group-specific mass message to at least one or more client nodes belonging to a particular group by using the read group-specific client node identifier and the connection information.

According to an embodiment of the invention, the apparatus for grouping client nodes can further include a monitoring unit that monitors a resource status for the particular MQTT broker.

According to an embodiment of the invention, the monitoring unit can monitor at least one of a network usage amount and a CPU usage amount for the particular MQTT broker.

According to an embodiment of the invention, the manager unit can monitor a load status for the at least one or more MQTT brokers.

According to an embodiment of the invention, the manager unit can create a new MQTT broker and can move at least a portion of the client nodes connected to the particular MQTT broker to the new MQTT broker, if a load greater than or equal to a threshold is detected for the particular MQTT broker.

An embodiment of the invention provides a method for grouping client nodes, where the method can include: receiving a connection request from a client node and assigning a particular MQTT (Message Queuing Telemetry Transport) broker to the client node in response to the connection request, the receiving of the connection request and the assigning performed at a manager unit; receiving identifier information and subscribed topic information of the client node from the client node by way of the particular MQTT from among at least one or more MQTT brokers, the receiving of the identifier information and the topic information performed at an MQTT brokerage unit; and newly connecting the client node by way of storing the received identifier information and the topic information in a database, the connecting performed at a load processing unit.

According to an embodiment of the invention, the method for grouping client nodes can further include receiving a topic publish message from the client node by way of the particular MQTT broker and requesting a topic publishing to the manager unit in response to the receiving of the topic publish message, wherein the receiving of the topic publish message and the requesting of the topic publishing to the manager unit can be performed at the MQTT brokerage unit, and the method can also include broadcasting content related to the topic publishing to other MQTT brokers in response to the request, the broadcasting performed at the manager unit.

According to an embodiment of the invention, the method for grouping client nodes can further include reading a group-specific client node identifier and connection information associated with the at least one or more MQTT brokers from a database and controlling the manager unit to publish a topic subscription status and the group-specific mass message to at least one or more client nodes belonging to a particular group by using the read group-specific client node identifier and the connection information, the reading and the controlling performed at a dashboard control unit.

According to an embodiment of the invention, the method for grouping client nodes can further include monitoring a resource status for the particular MQTT broker, where the monitoring can be performed at a monitoring unit, and the resource status can include at least one of a network usage amount and a CPU usage amount for the particular MQTT broker.

An embodiment of the invention provides a method for grouping client nodes, where the method can include: determining whether or not a load greater than or equal to a threshold is detected for a particular MQTT (Message Queuing Telemetry Transport) broker; generating a new MQTT broker if a load greater than or equal to a threshold is detected for the particular MQTT broker; and moving at least a portion of client nodes connected to the particular MQTT broker to the new MQTT broker.

An embodiment of the invention makes it possible to dynamically perform a logical grouping of client nodes by using the identifiers of the client nodes independent of subscription topic based on MQTT in an Internet of things environment in which terminals of various purposes are interconnected.

With an embodiment of the invention, mass messages for the notifying of emergency situations, maintaining and upkeep of the terminals, etc., can be transmitted to the corresponding groups based on the logical grouping.

An embodiment of the invention makes it possible to efficiently manage large numbers of client nodes through a dynamic logical grouping that is capable of responding to large numbers of client nodes in the home and in fields of industry such as the medical field, etc., where a smart environment is desired.

Additional aspects and advantages of the present invention will be set forth in part in the description which follows, and in part will be obvious from the description, or may be learned by practice of the invention.

DETAILED DESCRIPTION OF THE INVENTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

Figure 1:
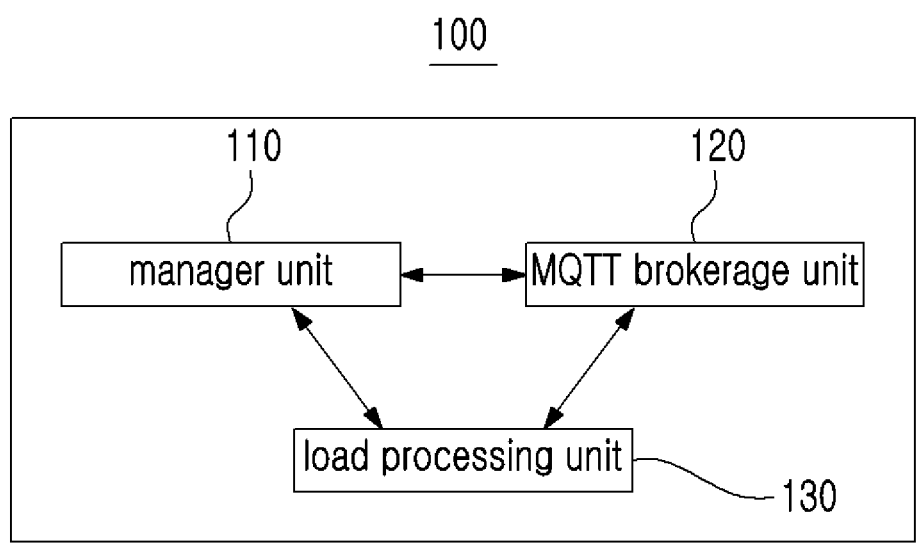
FIG. 1 illustrates a node grouping apparatus according to an embodiment of the invention.

FIG. 1 illustrates a node grouping apparatus 100 according to an embodiment of the invention.

To perform a logical grouping function that permits changes in a dynamic manner, an embodiment of the present invention may form a distributed MQTT structure, a more advanced implementation over the conventional MQTT structure, and may manage the identifiers and meta-information of the client nodes based on the manager unit of major MQTT brokers to enable real-time services.

For this, a node grouping apparatus 100 according to an embodiment of the invention can include a manager unit 110, an MQTT brokerage unit 120, and a load processing unit 130.

A manager unit 110 according to an embodiment of the invention can receive a connection request from a client node and can assign a particular MQTT (Message Queuing Telemetry Transport) broker to the client node in response to the connection request. For example, the manager unit 110 can consider the loads of at least one or more MQTT brokers in assigning a particular MQTT broker.

A MQTT brokerage unit 120 according to an embodiment of the invention can include at least one or more MQTT brokers. In one example, the MQTT brokerage unit 120 can receive a topic publish message from a client node and can send a request to the manager unit 110 for a topic publishing in response to receiving the topic publish message. Then, the manager unit 110 can respond to the request by broadcasting the content related to the topic publishing to other MQTT brokers.

Also, the MQTT brokerage unit 120 can receive from the client node the identifier information and subscribed topic information of the client node by way of a particular MQTT broker from among the at least one or more MQTT brokers.

Then, a load processing unit 130 according to an embodiment of the invention can store the received identifier information and topic information in a database to newly connect the client node.

A node grouping apparatus 100 according to an embodiment of the invention can further include a dashboard control unit (not shown).

The dashboard control unit (not shown) can control the manager unit 110 to perform a transmission of group-specific mass messages. For example, the dashboard control unit (not shown) can read a group-specific client node identifier and the connection information associated with the at least one or more MQTT brokers from a database. Also, the dashboard control unit (not shown) can control the manager unit to publish the topic subscription status and group-specific mass message to at least one or more client nodes belonging to a particular group by using the group-specific client node identifier and the connection information thus read.

A node grouping apparatus 100 according to an embodiment of the invention can further include a monitoring unit that monitors the resource status for a particular MQTT broker.

In one example, the monitoring unit (not shown) can be included within a MQTT broker to monitor the resource status of the particular MQTT broker.

In one example, the monitoring unit (not shown) can monitor at least one of the network usage amount and CPU usage amount of the particular MQTT broker. In this case, the manager unit 110 can monitor the load status of at least one or more MQTT brokers. More specifically, if a load greater than or equal to a threshold is detected for a particular MQTT broker, then the manager unit 110 can create a new MQTT broker and move at least a portion of the client nodes that were connected to the particular MQTT broker to the new MQTT broker.

The node grouping apparatus 100 according to an embodiment of the invention relates to a technology for providing various services in real time based on the MQTT (Message Queuing Telemetry Transport) protocol, which is an existing ISO standard, in situations where various mobile nodes are connected via the Internet of things. MQTT is a message transmission protocol currently utilized in various industrial fields to connect to the Internet of things and provide a smart environment.

An embodiment of the invention may adopt a distributed MQTT structure having expandability, such structure having been developed based on the standard MQTT protocol. Based on the operating method for the distributed MQTT structure that allows expandability and on the method of managing the identifiers of client nodes, it is possible to transmit group-specific mass messages according to a real-time logical grouping.

By virtue of this feature, an embodiment of the invention can be applied to any field that requires real-time services and node management in a cloud and Internet of things environment where large numbers of client nodes are incorporated.

A detailed description is provided below, with reference to FIGS. 2 to 7, of a node grouping apparatus according to an embodiment of the invention and a corresponding method of grouping nodes.

Figure 2:
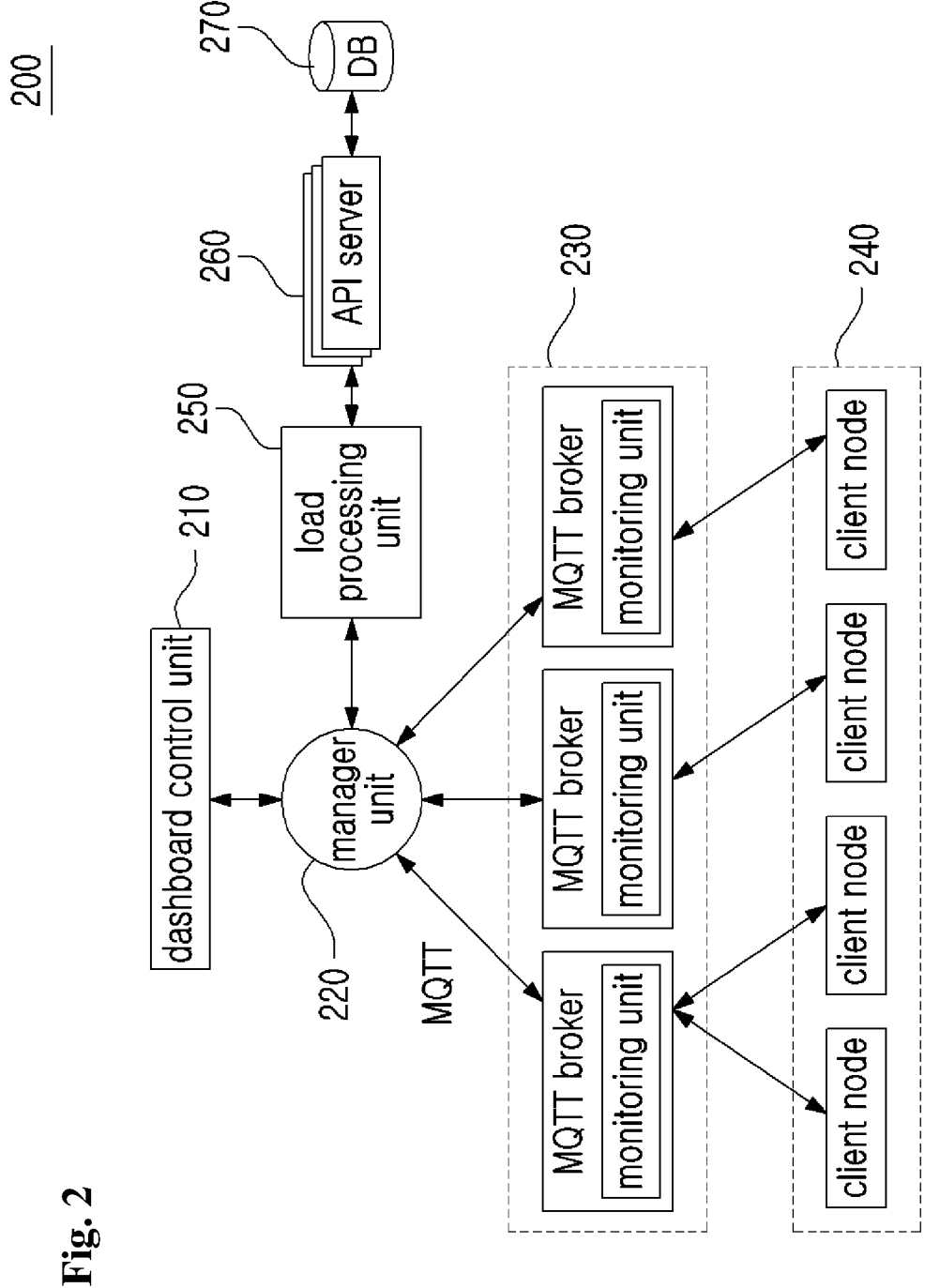
FIG. 2 illustrates a distributed MQTT structure to which a node grouping apparatus according to an embodiment of the invention has been applied.

FIG. 2 illustrates a distributed MQTT structure 200 to which a node grouping apparatus according to an embodiment of the invention has been applied.

As shown in FIG. 2, the manager unit 220 can perform the operations of monitoring the resources of the MQTT brokers 230 and balancing the loads of the first connected client nodes 240, to thereby enable a real-time service with an expansion of MQTT brokers according to circumstances.

Also, the management of the identifiers of connected nodes using a database 270 makes it possible to transmit messages independent of the subscription topics of the connected nodes. This in turn enables a dynamic logical grouping based on the identifiers of the connected nodes and can provide a function of transmitting group-specific mass messages as necessary.

Unlike existing technology, an embodiment of the invention may perform a group management of the client nodes 240 that is independent of the subscription topics, so that a logical grouping of a dynamic nature can be achieved. For the grouping that is independent of subscription topic, the grouping can be performed using connected node identifiers (ID) that are generated internally in MQTT for differentiating nodes. Thus, an embodiment of the invention can enable direct message transmissions using client node identifiers and can enable transmissions of group-specific mass messages through a logical management of the client node identifiers for dynamic grouping.

To this end, referring to reference numeral 200, a distributed MQTT structure 200 may include a dashboard control unit 210, a manager unit 220, MQTT brokers 230, monitoring units, client nodes 240, a load processing unit 250, an API server 260, and a database 270.

First, the manager unit 220 may perform the functions of transferring messages (topic, group messages) between brokers, balancing the loads of the brokers, creating/deleting brokers according to the load balancing policy, publishing messages to the database, saving logs, and the like.

The MQTT brokers 230 may perform a message pub/sub function according to a standard MQTT protocol and may store a log related to the connecting and disconnecting of client nodes in a database.

The monitoring unit may monitor the load status of a MQTT broker and may store the monitoring log in the database 270.

The dashboard control unit 210 can provide a web-based interface to allow a service provider to manage client nodes and transmit group-specific mass messages through a logical grouping within a real-time mobile cloud service.

Figure 3:
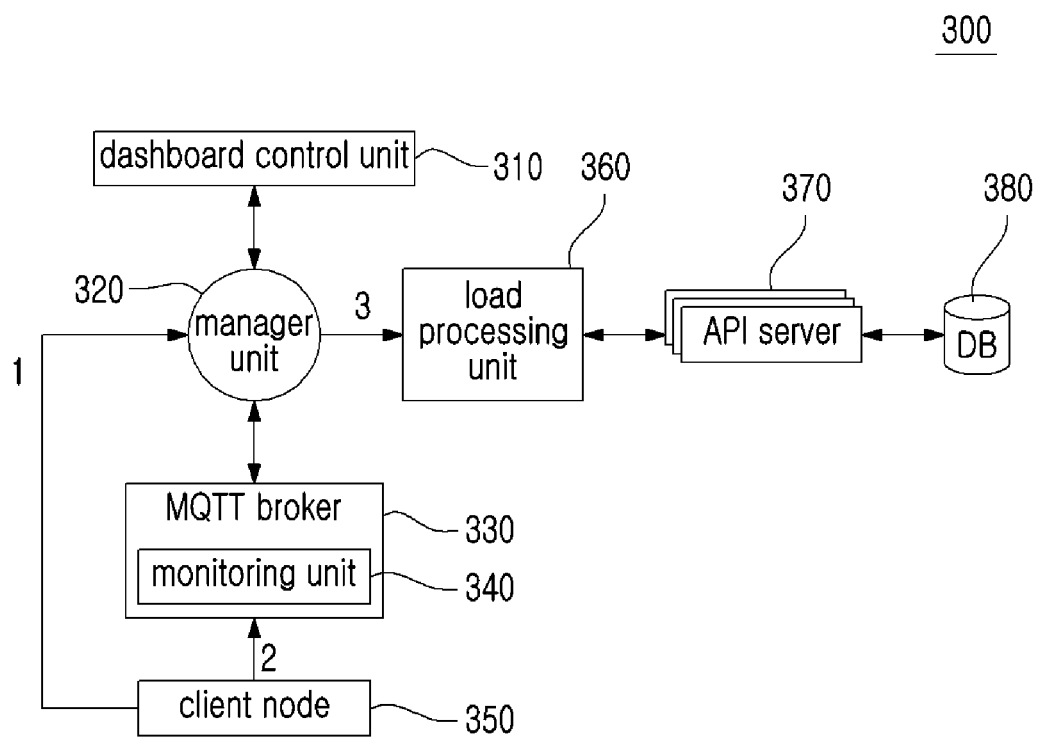
FIG. 3 illustrates the process of connecting a new node in a distributed MQTT structure to which a node grouping apparatus according to an embodiment of the invention has been applied.

FIG. 3 shows an embodiment 300 illustrating the process of connecting a new node in a distributed MQTT structure to which a node grouping apparatus according to an embodiment of the invention has been applied.

Since a distributed MQTT structure enables the MQTT brokers 330, which follow a standard MQTT protocol, to expand to distributed nodes, a process for connecting a client node 350 may be required.

The client node 350 may first attempt a connection to the manager unit 320 and may be assigned a suitable MQTT broker 330 according to the load balancing policy.

The MQTT broker 330 can store the identifier information and subscribed topic information of the connected client node 350 in the database 380 by using the API server 370.

Here, the MQTT broker 330 can periodically collect the resource status of the MQTT broker 330 and store the resource status in the database 380 via the load processing unit 360 and the API server 370.

Figure 4:
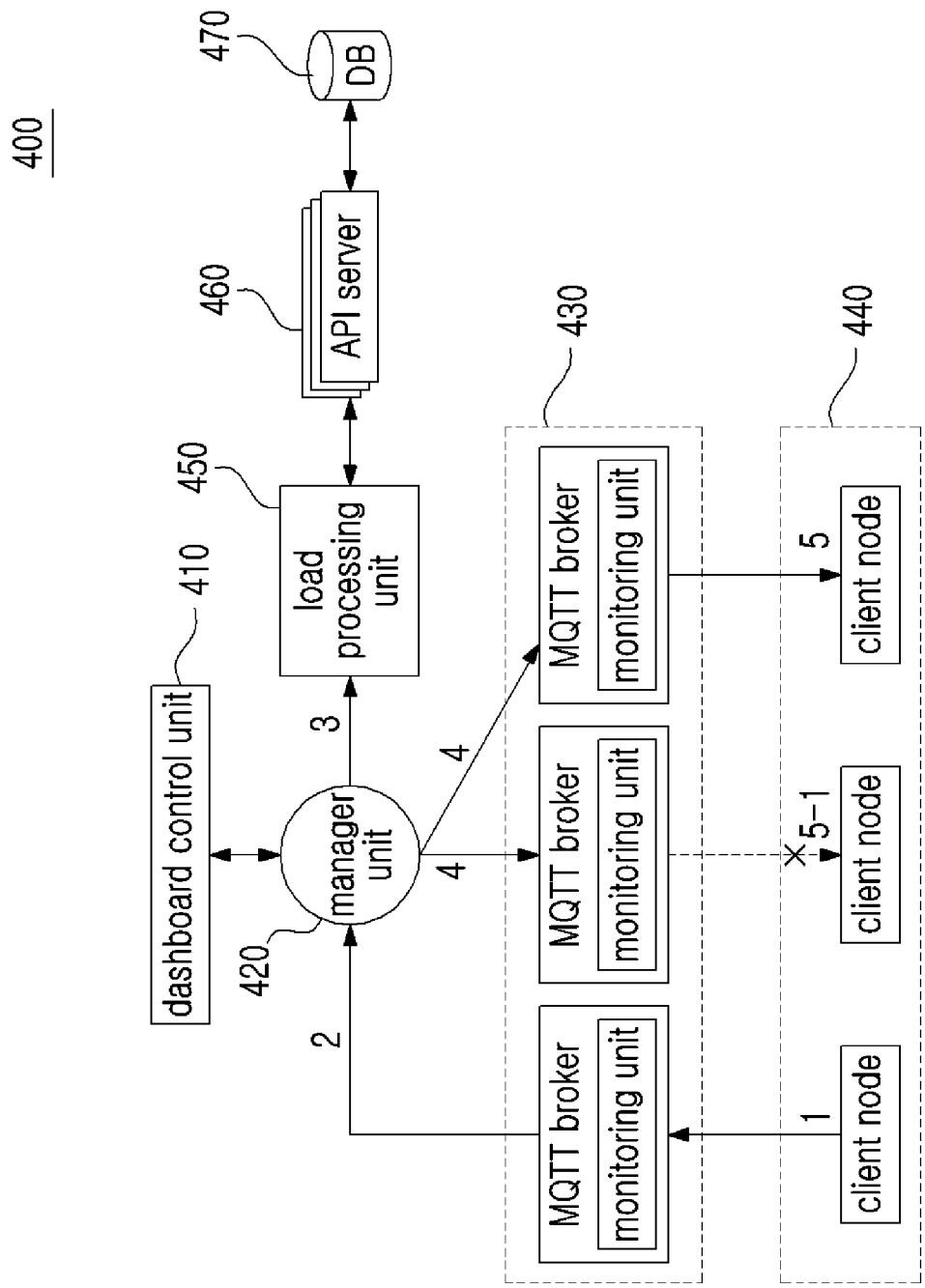
FIG. 4 illustrates a topic-based publishing process in a distributed MQTT structure to which a node grouping apparatus according to an embodiment of the invention has been applied.

FIG. 4 shows an embodiment 400 illustrating a topic-based publishing process in a distributed MQTT structure to which a node grouping apparatus according to an embodiment of the invention has been applied.

A topic publishing process may refer to the process of publishing a message to other clients when one connected client node from among the client nodes 440 publishes a message as a particular topic.

From among the MQTT brokers 430, a particular MQTT broker can transfer a publish message that was received from a connected client node to the manager unit 420.

The manager unit 420 may broadcast the published content to all MQTT brokers, so as to transfer the content to the topic-subscribed client nodes that are connected to other MQTT brokers.

If a MQTT broker has no client node that is subscribed to the corresponding topic, the MQTT broker may ignore the broadcast.

In one embodiment, the manager unit 420 can periodically collect the resource status and store the resource status in the database 470 via the load processing unit 450 and the API server 460.

Figure 5:
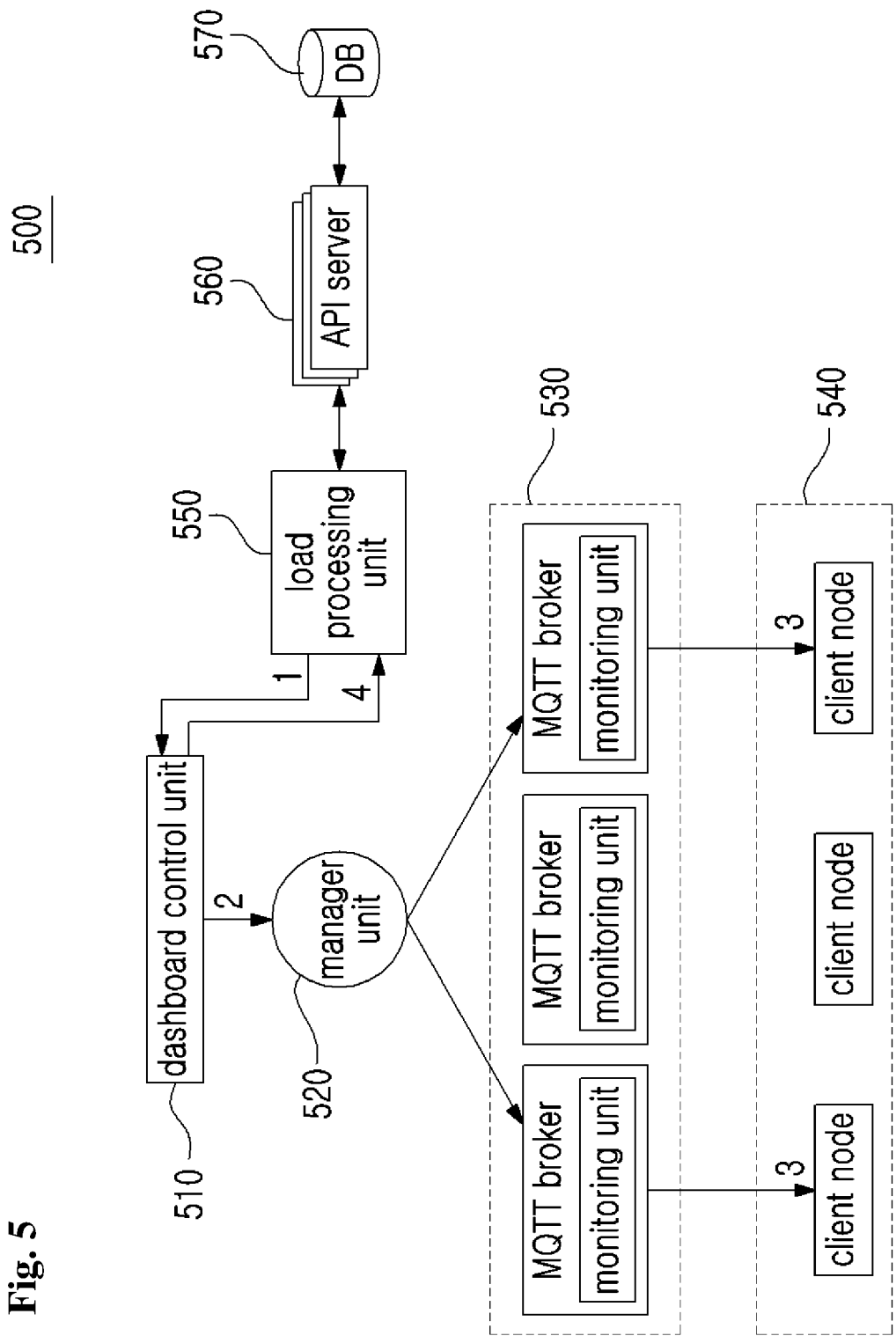
FIG. 5 illustrates the process of transmitting a group-specific mass message in a distributed MQTT structure to which a node grouping apparatus according to an embodiment of the invention has been applied.

FIG. 5 shows an embodiment 500 illustrating the process of transmitting a group-specific mass message in a distributed MQTT structure to which a node grouping apparatus according to an embodiment of the invention has been applied.

This embodiment 500 illustrates the function of transmitting mass messages to logically composed groups, which may be considered a key point of the distributed MQTT approach. First, with a dynamic logical grouping having been achieved by a service provider by way of the dashboard control unit 510, information on group-specific client identifiers and connection MQTT brokers may be retrieved from the database in response to a mass message transmission request.

The manager unit 520 may transfer the respective client identifiers through information on a particular MQTT broker from among the connected MQTT brokers 530, and the corresponding MQTT broker may publish a message that is independent of the topic subscription status to client nodes 540 belonging to a group.

In one example, the dashboard control unit 510 can collect the resource status periodically and store the resource status in the database 570 via the load processing unit 550 and the API server 560.

Figure 6:
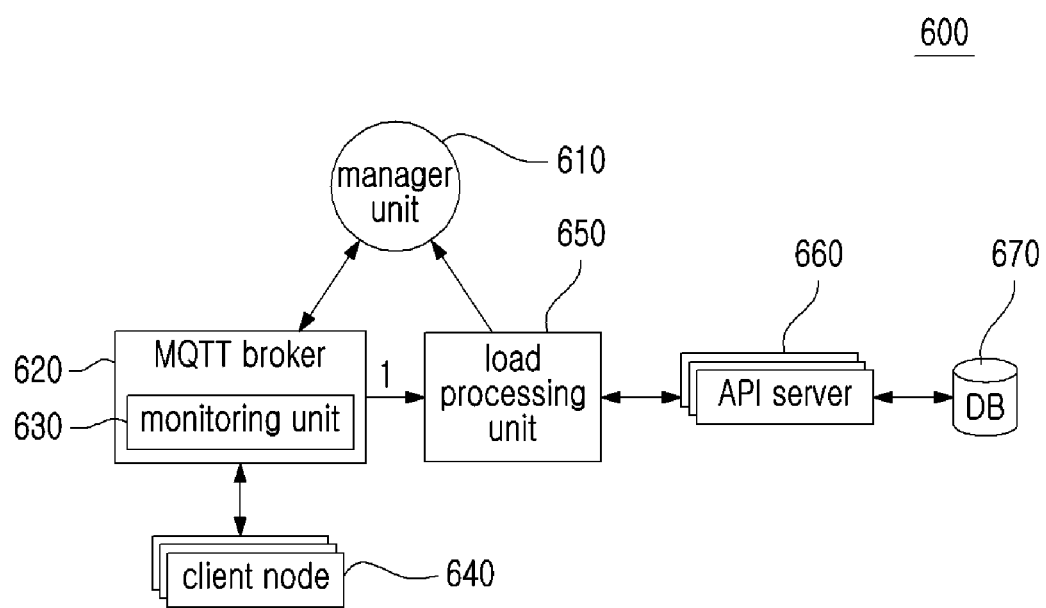
FIG. 6 illustrates how a monitoring unit may monitor the load of an MQTT broker in a distributed MQTT structure to which a node grouping apparatus according to an embodiment of the invention has been applied.

FIG. 6 shows an embodiment 600 illustrating how a monitoring unit 630 may monitor the load of an MQTT broker in a distributed MQTT structure to which a node grouping apparatus according to an embodiment of the invention has been applied.

According to this embodiment 600, the manager unit 610 can monitor the load of the MQTT broker 620 by way of the monitoring unit 630 and the load processing unit 650.

The monitoring unit 630 located within the MQTT broker 620 can periodically collect the resource status of the MQTT broker 620 and store the resource status in the database 670 through the API server 660. Examples of the resource status can include network usage amount, CPU usage amount, etc., and the manager unit 610 can monitor the load status of all MQTT brokers and can use the load balancing results when assigning newly connected client nodes to MQTT brokers.

Figure 7:
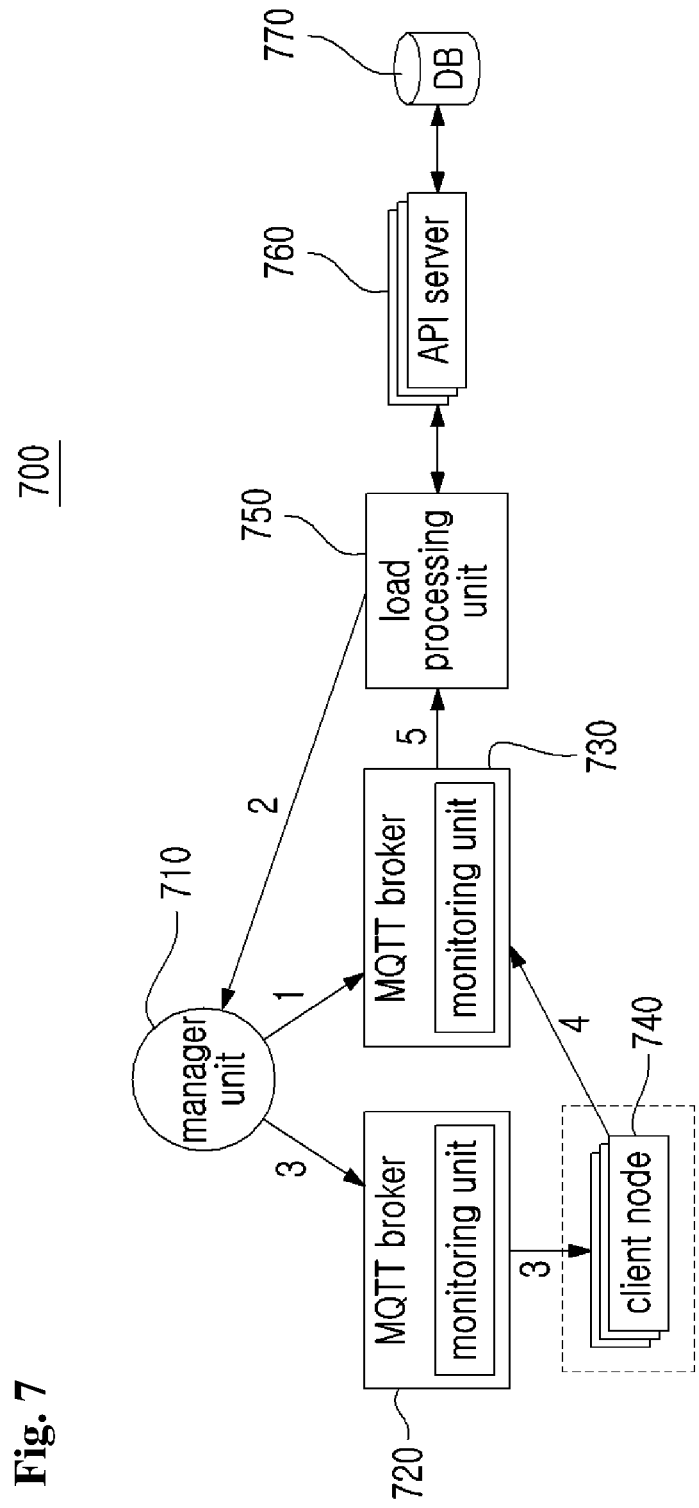
FIG. 7 illustrates processes for detecting the load of a particular MQTT broker and expanding in a distributed MQTT structure to which a node grouping apparatus according to an embodiment of the invention has been applied.

FIG. 7 shows an embodiment 700 illustrating processes for detecting the load of a particular MQTT broker and expanding in a distributed MQTT structure to which a node grouping apparatus according to an embodiment of the invention has been applied.

According to this embodiment 700, an expansion of MQTT brokers 730 can be performed when the load of a particular MQTT broker 720 is detected during load status monitoring.

This embodiment 700 illustrates the processes for creating a new MQTT broker 730 and moving clients that were connected with an existing MQTT broker 720 to the new MQTT broker 730. As regards the moving process, the direct message transmission based on client identifiers enabled by the present technology allows for easy client movement. In contrast, if direct message transmissions based on client identifiers is not possible, as is the case in existing technology, the method of transferring messages only to certain client nodes of which moving is required would be subservient to topic, and therefore a separate re-subscribing process would be needed, making it impossible to move client nodes in real time according to detected loads.

A monitoring unit located within a created MQTT broker 730 can periodically collect the resource status of the MQTT broker 730 and store the resource status in the database 770 by way of the load processing unit 750 and the API server 760.

Figure 8:
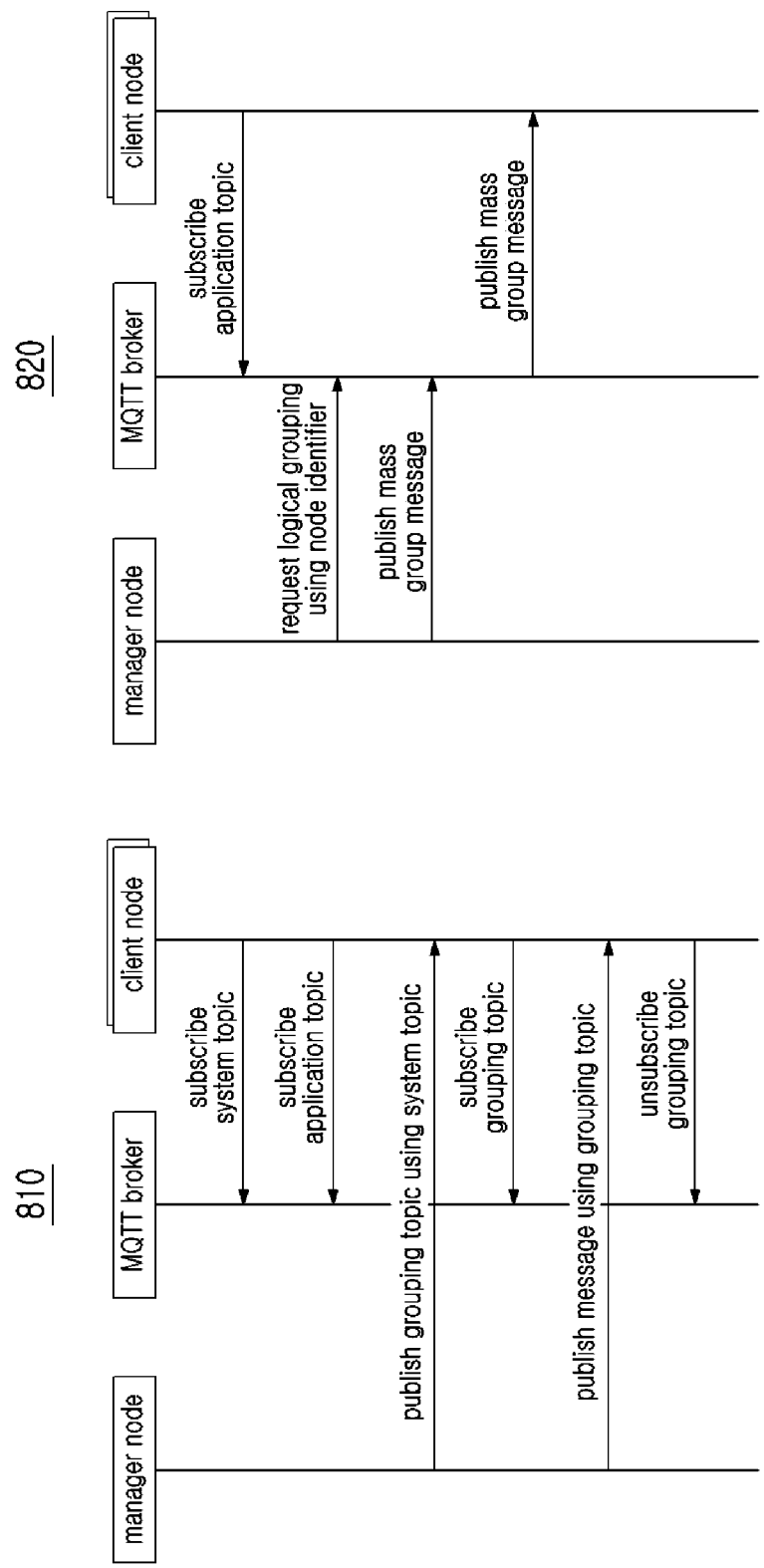
FIG. 8 compares the procedures for transmitting a group message based on topic according to the related art with the procedures for transmitting a group message based on node identifiers according to an embodiment of the invention.

FIG. 8 compares the procedures for transmitting a group message based on topic according to the related art with the procedures for transmitting a group message based on node identifiers according to an embodiment of the invention.

Reference numeral 810 corresponds to a topic-based group message transmission process according to the related art, whereas reference numeral 820 corresponds to node identifier-based group message transmission according to an embodiment of the invention.

As shown with reference numeral 810, the existing technology entails transmitting group messages using topics, so that in order to establish new groups and transmit group messages, a separate process of subscribing to group topics are needed for each node, which process may incur much delay.

In an embodiment of the invention, however, as shown with reference numeral 820, the MQTT broker may hold the node identifier information, and the manager can designate a grouping using node identifiers and can request a node identifier-based mass group message to the corresponding group. Also, since a dynamic grouping based on node identifiers is possible as described above and since node management can thus be made simpler and more flexible, the delay time in managing each node in a real-time service environment can be minimized.

Thus, an embodiment of the invention makes it possible to dynamically perform a logical grouping of client nodes by using the identifiers of the client nodes independent of subscription topic based on MQTT, as well as to transmit group-specific mass messages for the notifying of emergency situations, maintaining and upkeep of the terminals, etc., in an Internet of things environment where terminals of various purposes are interconnected.

Figure 9:
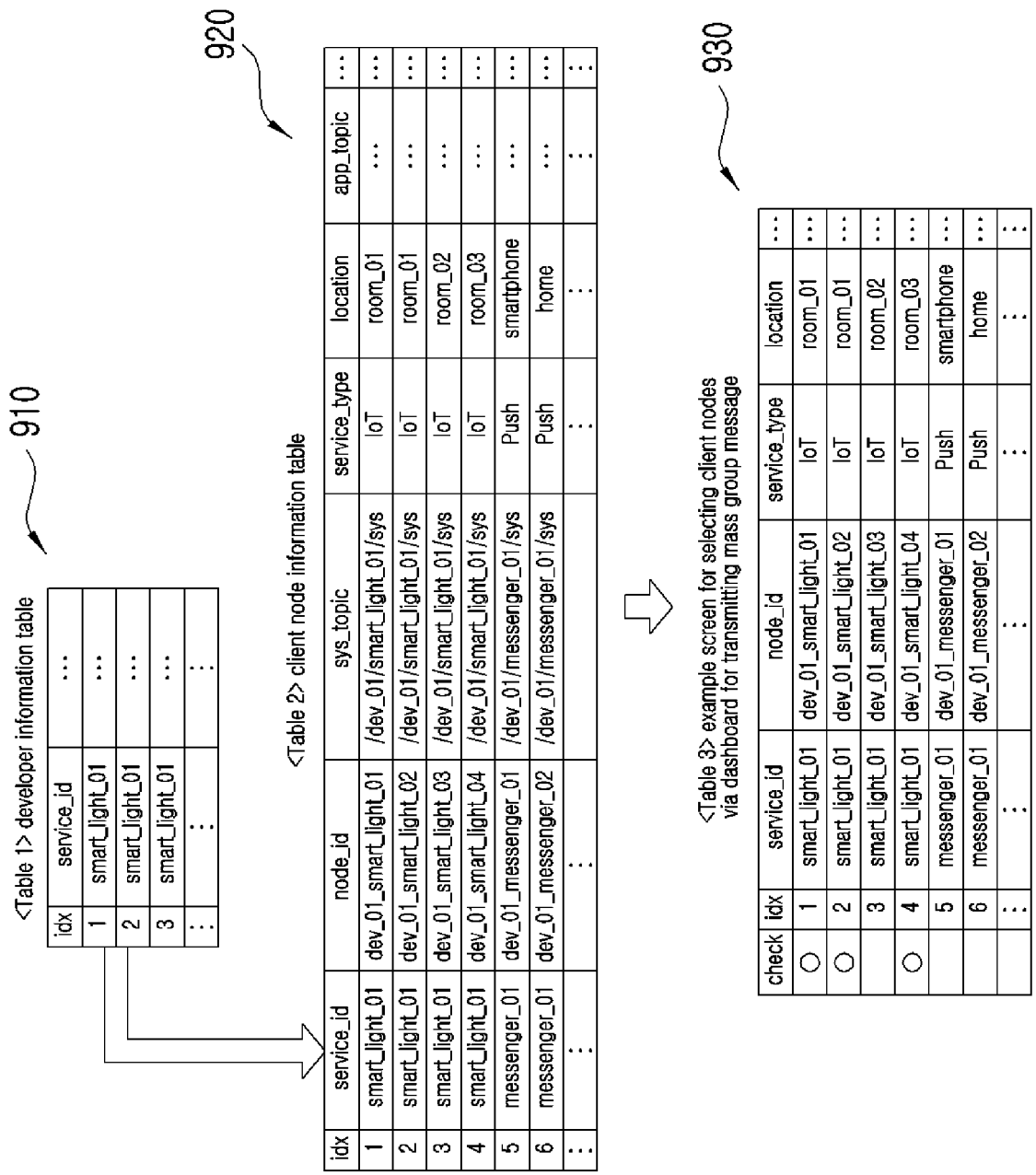
FIG. 9 illustrates an example of grouping client nodes based on developer identifiers.

FIG. 9 illustrates an example of grouping client nodes based on developer identifiers.

In order to perform a Pub/Sub function for a real-time IoT service, a real-time remote management function for IoT nodes, and the like, it is necessary that the identity and environment information of each client node be available for viewing in the system.

To this end, an embodiment of the invention can store the information of the client nodes and perform dynamic grouping in the following manner.

First, an embodiment of the invention can consider the case where only some of the lighting devices must be controlled urgently in a large auditorium having numerous smart lighting devices installed therein.

An apparatus and a method for grouping client nodes according to an embodiment of the invention can group the lighting devices (node_id) of the corresponding locations (location) through the dashboard of a management page.

For example, where a mass control message (e.g. turn on/off) has to be transmitted to the corresponding group, those cases where the location information cannot be obtained in the scenario would require a process of transmitting a control message to each of the lighting devices or subscribing to a new topic, causing much delay.

The table represented by reference numeral 910 can be made to generate the ID of the client nodes (node_id) according to the service that the developer wishes to provide based on the developer ID (developer_id), to become the table represented by reference numeral 920. These can correspond to the client node identifiers referred to above in the context of the present invention.

The client node identifiers may be assigned as identifiers that reflect service type, to allow macroscopic differentiation between client nodes. Furthermore, an embodiment of the invention can additionally manage meta-information for each client node, so as to provide a dynamic grouping in real time. The meta-information may include service type (service_id, service_type), the location of the client node (location), and the like. Thus, based on the identifiers and meta-information of the client nodes, it is possible to provide dynamic grouping according to the type of service provided and the locations of the client nodes, without being constrained by the number of client nodes.

The table represented by reference numeral 930 is an example of a screen for selecting a client node via a dashboard, for transmitting a mass group message.

Thus, an embodiment of the invention may configure a distributed MQTT structure to perform a logical grouping function in a manner that allows dynamic changes and may manage the identifiers and meta-information of the client nodes based on a central manager unit to enable real-time services.

The apparatus described above can be implemented as hardware elements, software elements, and/or a combination of hardware elements and software elements. For example, the apparatus and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions.

A processing device can be used to execute an operating system (OS) and one or more software applications that operate on said operating system. Also, the processing device can access, store, manipulate, process, and generate data in response to an execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

What is claimed is:

1. An apparatus for grouping client nodes, the apparatus comprising:
   a hardware processor; and
   a memory storing instructions that, when executed by the hardware processor, provide,
      a manager configured to receive a connection request from a client node and assign a particular MQTT (Message Queuing Telemetry Transport) broker to the client node in response to the connection request,
      an MQTT brokerage comprising at least one or more MQTT brokers, the MQTT brokerage configured to receive identifier information and subscribed topic information of the client node from the client node by way of the particular MQTT broker from among the at least one or more MQTT brokers, a load processor configured to store the received identifier information and the topic information in a database to newly connect the client node, and a dashboard controller configured to control a transmission of a group-specific mass message, wherein the dashboard controller reads a group-specific client node identifier and connection information associated with the at least one or more MQTT brokers from a database and controls the manager to publish a topic subscription status and the group-specific mass message to at least one or more client nodes belonging to a particular group by using the read group-specific client node identifier and the connection information.

2. The apparatus for grouping client nodes according to claim 1, wherein the manager assigns the particular MQTT broker from among the at least one or more MQTT brokers in consideration of load.

3. The apparatus for grouping client nodes according to claim 1, wherein the MQTT brokerage receives a topic publish message from the client node by way of the particular MQTT broker and requests a topic publishing to the manager in response to receiving the topic publish message, and the manager broadcasts content related to the topic publishing to other MQTT brokers in response to the request.

4. The apparatus for grouping client nodes according to claim 1, further comprising a monitor configured to monitor a resource status for the particular MQTT broker.

5. The apparatus for grouping client nodes according to claim 4, wherein the monitor monitors at least one of a network usage amount and a CPU usage amount for the particular MQTT broker.

6. The apparatus for grouping client nodes according to claim 1, wherein the manager monitors a load status for the at least one or more MQTT brokers.

7. The apparatus for grouping client nodes according to claim 1, wherein the manager creates a new MQTT broker and moves at least a portion of client nodes connected to the particular MQTT broker to the new MQTT broker, if a load greater than or equal to a threshold is detected for the particular MQTT broker.

8. A method for grouping client nodes by an apparatus including a hardware processor, the method comprising:

executing, by the hardware processor, instructions that cause the apparatus to, receive a connection request from a client node and assigning a particular MQTT (Message Queuing Telemetry Transport) broker to the client node in response to the connection request, the receiving of the connection request and the assigning performed at a manager, receive identifier information and subscribed topic information of the client node from the client node by way of the particular MQTT broker from among at least one or more MQTT brokers, the receiving of the identifier information and the topic information performed at an MQTT, newly connect the client node by way of storing the received identifier information and the topic information in a database, the connecting performed at a load processor, read a group-specific client node identifier and connection information associated with the at least one or more MQTT brokers from a database, and control the manager to publish a topic subscription status and the group-specific mass message to at least one or more client nodes belonging to a particular group by using the read group-specific client node identifier and the connection information, the reading and the controlling performed at a dashboard controller.

9. The method for grouping client nodes according to claim 8, wherein execution of the instructions by the hardware processor further causes the apparatus to, receive a topic publish message from the client node by way of the particular MQTT broker, and request a topic publishing to the manager in response to the receiving of the topic publish message, wherein the receiving of the topic publish message and the requesting of the topic publishing to the manager are performed at the MQTT brokerage, and wherein execution of the instructions by the hardware processor further causes the apparatus to broadcast content related to the topic publishing to other MQTT brokers in response to the request, the broadcasting performed at the manager.

10. The method for grouping client nodes according to claim 8, wherein execution of the instructions by the hardware processor further causes the apparatus to monitor a resource status for the particular MQTT broker, the monitoring performed at a monitor, and wherein the resource status includes at least one of a network usage amount and a CPU usage amount for the particular MQTT broker.

11. A method for grouping client nodes by an apparatus including a hardware processor, the method comprising:

executing, by the hardware processor, instructions that cause the apparatus to, determine whether or not a load greater than or equal to a threshold is detected for a particular MQTT (Message Queuing Telemetry Transport) broker, generate a new MQTT broker if a load greater than or equal to a threshold is detected for the particular MQTT broker, and move at least a portion of client nodes connected to the particular MQTT broker to the new MQTT broker based on client node identifiers of the respective client nodes, the client node identifiers being assigned based on a logical grouping of the client nodes.

12. The method of claim 11, wherein the client node identifiers are assigned to the respective client nodes based on one or more of, a service involving the respective client nodes, and a location of the respective client nodes.

13. The method of claim 11, wherein execution of the instructions by the hardware processor further causes the apparatus to refrain from re-subscribing the at least a portion of the client nodes to topics on the new MQTT broker.

* * * * *